United States Patent Office 3,081,305
Patented Mar. 12, 1963

3,081,305
PHENTHIAZINE DERIVATIVES
Robert Michel Jacob, Ablon-sur-Seine, and Jacques Georges Robert, Gentilly, France, assignors to Societe des Usines Chimiques Rhone-Poulenc, Paris, France, a French body corporate
No Drawing. Filed Mar. 10, 1961, Ser. No. 94,676
Claims priority, application France Mar. 19, 1960
9 Claims. (Cl. 260—243)

This invention relates to new derivatives of phenthiazine, to a process for their preparation, and pharmaceutical compositions containing them.

During the past fifteen years, considerable research and experimentation have been conducted in the field of N-substituted phenthiazine derivatives and certain of these compounds have been found to possess valuable therapeutic properties. Some are useful primarily on account of outstanding antihistaminic activity, others because of their tranquillising action and of their efficacy as anti-shock agents and yet others are, for example, effective agents for controlling or minimising motion-sickness. It has neverthless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which possess unexpectedly useful pharmacological properties of a nature hereinafter referred to in detail and of a degree of activity that could not have been predicted from knowledge of their chemical structure.

The phenthiazine derivatives of the present invention are those which conform to the general formula:

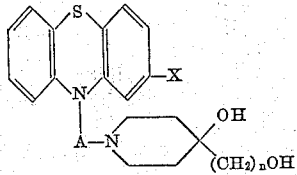

(wherein X represents a hydrogen or halogen atom or an alkyl, alkoxy, acyl, alkoxycarbonyl, alkylthio, alkanesulphonyl, dimethylsulphamoyl, cyano or trifluoromethyl group, A represents a divalent, saturated, straight or branched chain aliphatic hydrocarbon group containing two to four carbon atoms with at least two carbon atoms between the nitrogen atoms of the phenthiazinyl and piperidyl nuclei, and $n$ is 1, 2 or 3) and their acid addition and quaternary ammonium salts. The hydrocarbon chain A may be, for example, any of the following groups: —$(CH_2)_2$—, —$CH_2$—$CH(CH_3)$—, —$(CH_2)_3$—, —$CH(CH_3)$—$CH_2$—$CH_2$—, —$CH_2$—$CH(CH_3)$—$CH_2$—, —$(CH_2)_4$—. Certain of the compounds conforming to general Formula I have an asymmetric carbon atom in the chain A, such as those compounds with the branched chain —$CH_2$—$CH(CH_3)$—, —$CH(CH_3)$—$CH_2CH_2$— or —$CH_2$—$CH(CH_3)$—$CH_2$— and consequently can exist in optically active forms. The invention includes within its scope the racemates as well as corresponding optically active isomers of such compounds.

In this specification and accompanying claims, the alkyl, alkoxy, acyl and alkane groups referred to contain not more than four carbon atoms.

According to a feature of the invention, the new phenthiazine derivatives are prepared by the process which comprises reacting a phenthiazine compound of the general formula:

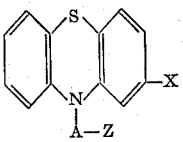

with a piperidine compound of the general formula:

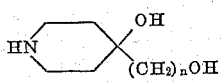

wherein Z represents the acid residue of a reactive ester such as a halogen atom or a sulphuric or sulphonic ester residue, e.g. the methanesulphonyloxy or toluene-p-sulphonyloxy group, and the other symbols are as hereinbefore defined.

The reaction may be carried out by heating the reagents at a temperature between 30° and 120° C., preferably in an inert organic solvent such as an aromatic hydrocarbon (for example, benzene or toluene) or an alcohol (for example, ethanol) if desired in the presence of a condensing agent acting as an acid acceptor, such as an alkali metal carbonate or a tertiary amine (for example, triethylamine or pyridine). An excess of the piperidine compound may equally well be used as condensing agent.

Optically active products may be obtained by commencing with starting materials of Formula II which are themselves optically active. They may also be prepared by optical resolution of the corresponding racemates.

The phenthiazine derivatives of general Formula I may be converted in manner known per se into acid addition and quaternary ammonium salts. The acid addition salts may be obtained by the action of acids on the phenthiazine bases in appropriate solvents. As organic solvents there may be used, for example, alcohols and ethers; water may advantageously be used as an inorganic solvent. The salt which is formed is precipitated, if necessary after concentration of its solution, and is separated by filtration or decantation. The quaternary ammonium salts may be obtained by the action of esters on the phenthiazine bases, optionally in an organic solvent, at room temperature or, more rapidly, with gentle heating.

The new phenthiazine derivatives of general Formula I may be purified by physical methods such as distillation, crystallisation or chromatography, or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The new phenthiazine compounds of the present invention possess valuable pharmacodynamic properties. They are active on the central nervous system and are, in particular, excellent antiemetics. They also possess a high level of analgesic activity. Compounds of the present invention which possess outstanding utility in the aforesaid respects are those in which the hydrocarbon chain A is

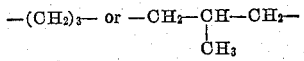

Individual compounds of importance are 3-methoxy-10-(3 - 4' - hydroxy - 4' - β - hydroxyethyl - 1' - piperidyl-2 - methylpropyl)phenthiazine, 3 - methoxy - 10 - (3,4'-hydroxy - 4' - hydroxymethyl - 1' - piperidyl - 2 - methylpropyl)phenthiazine, 3-trifluoromethyl-10-(3-4'-hydroxy-4'-hydroxymethyl-1'-piperidylpropyl)phenthiazine, 3-cyano - 10 - (3 - 4' - hydroxy - 4' - hydroxymethyl - 1'- piperidylpropyl)phenthiazine, 3-methlythio-10-(3,4'-hydroxy - 4' - hydroxymethyl - 1' - piperidyl - 2 - methylpropyl)phenthiazine, 3-chloro - 10-(3-4'-hydroxy-4'-hydroxymethyl-1'-piperidylpropyl)phenthiazine, and 3-dimethylsulphamoyl - 10 - (3 - 4' - hydroxy - 4' - hydroxymethyl-1'-piperidylpropyl)phenthiazine.

For therapeutic purposes, the bases of general Formula I are employed as such or in the form of non-toxic acid addition salts, e.g. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, tartrates, methanesulphonates, ethanedisulphonates, chlorotheophyllinates, theophylline-acetates, salicylates, phenolphthalinates, and methylene-bis-β-hydroxynaphthoates) so that the benefiical physiological properties inherent in the bases are not vitiated by side-effects ascribable to the anions. However, they may also be employed in the form of non-toxic quaternary ammonium salts obtained by reaction with organic halides (e.g. methyl, ethyl, allyl or benzyl chloride, bromide or iodide) or other reactive esters, e.g. methyl or ethyl sulphates, benzene sulphonates or toluene-p-sulphonates.

The following examples illustrate the invention.

*Example I*

A solution of 3-methoxy-10-(3-methanesulphonyloxy-2-methylpropyl)-phenthiazine (13.3 g.) and 4-hydroxy-4-(2-hydroxyethyl)piperidine (10.15 g.) in anhydrous benzene (100 cc.) is heated under reflux for 6 hours. After cooling, the reaction medium is extracted by stirring with N hydrochloric acid (100 cc.). The aqueous acid phase is separated, made alkaline by the addition of sodium hydroxide solution ($d=1.33$; 15 cc.) and the free base extracted with anaesthetic-grade ether. The organic solution is dried over anhydrous potassium carbonate and the solvent removed on the water-bath under a pressure of about 20 mm. Hg. 3-methoxy-10-(3-4'-hydroxy - 4' - β - hydroxyethyl - 1' - piperidyl - 2 - methylpropyl)phenthiazine (11.0 g.) is obtained which, after recrystallisation from acetonitrile, is a creamy-white crystalline powder, M.P. 90–92° C.

The initial 4 - hydroxy-4-(2-hydroxyethyl)piperidine (M.P. 79–80° C.) is obtained by the debenzylation in methanol, in the presence of palladised charcoal at 70° C. under a pressure of 100 kg./cm.² of hydrogen, of 1-benzyl-4-hydroxy-4-(2-hydroxyethyl)piperidine, itself prepared according to Grob and Brenneisen, Helv. 41, 1184 (1958).

*Example II*

A solution of 3-methoxy-10-(3-methanesulphonyloxy-2-methylpropyl)phenthiazine (19.0 g.) and 4-hydroxy-4-hydroxymethylpiperidine (13.1 g.) anhydrous benzene (100 cc.) is heated under reflux for 7 hours. After cooling, the reaction medium is washed with N sodium hydroxide solution (120 cc.). The organic layer is separated and then extracted by stirring with N hydrochloric acid (150 cc.). The aqueous acid phase is separated, made alkaline by the addition of sodium hydroxide solution ($d=1.33$; 20 cc.) and the free base extracted with anesthetic-grade ether. The organic solution is dried over anhydrous potassium carbonate and the solvent removed on the water-bath under a pressure of about 20 mm. Hg. 3 - methoxy - 10 - (3,4' - hydroxy - 4' - hydroxymethyl-1'-piperidyl-2-methylpropyl)phenthiazine (15.2 g.) is obtained which, after recrystallisation from acetonitrile, is a creamy-white crystalline powder, M.P. 133–134° C.

The initial 4-hydroxy-4-hydroxymethylpiperidine (M.P. 126–128° C.) is obtained by the debenzylation in methanol, in the presence of palladised charcoal at 100° C. under a pressure of 100 kg./cm.² of hydrogen, of 1-benzyl-4-hydroxy-4-hydroxymethylpiperidine (M.P. 82° C., B.P. 130–160° C./0.6 mm. Hg) itself prepared by the reduction with lithium aluminum hydride in ether, of 1-benzyl-4 - hydroxy - 4 - ethoxycarbonylpiperidine. 1-benzyl-4-hydroxy-4-ethoxycarbonylpiperidine (B.P. 135–148° C./0.6 mm. Hg) is obtained by the saponification, followed by esterification, of 1-benzyl-4-hydroxy-4-cyanopiperidine (M.P. 95–97° C.), itself prepared by the action of dilute hydrochloric acid on an aqueous solution of 1-benzyl-piperid-4-one and potassium cyanide.

*Example III*

A solution of 3-trifluoromethyl-10-(3-chloropropyl) phenthiazine (17.2 g.) and 4-hydroxy-4-hydroxymethylpiperidine (7.2 g.) in anhydrous ethanol (250 cc.) is heated for 18 hours under reflux in the presence of powdered anhydrous sodium carbonate (5.3 g.). Further sodium carbonate (2.65 g. is added and heating continued for 8 hours. After a final addition of sodium carbonate (2.65 g.) the reaction is completed by heating for 16 hours under reflux. Ethanol is removed under reduced pressure (about 20 mm. Hg) and the residue taken up in distilled water (250 cc.) and extracted with ether (450 cc.). The ethereal phase is extracted with 0.12 N hydrochloric acid (1150 cc.). The aqueous phase is separated, made alkaline with sodium hydroxide solution ($d=1.33$; 20 cc.) and the free base extracted with ether. The organic solution is dried over anhydrous potassium carbonate and concentrated to dryness under reduced pressure (about 15 mm. Hg). 3 - trifluoromethyl-10-(3,4'-hydroxy-4'-hydroxymethyl-1'-piperidylpropyl)phenthiazine (15.2 g.) is thus obtained which, after two successive recrystallisations from acetonitrile, is a white crystalline powder, M.P. 122–124° C.

4-hydroxy-4-hydroxymethylpiperidine (M.P. 126–128° C.) is prepared from 1-benzylpiperid-4-one via the following compounds:

1-benzyl-4-hydroxy-4-cyanopiperidine (M.P. 95–97° C.),
1 - benzyl - 4 - hydroxy-4-ethoxycarbonylpiperidine (B.P. 135–148° C./0.5 mm. Hg), and
1-benzyl-4-hydroxy-4-hydroxymethylpiperidine (M.P. 81–82° C.).

*Example IV*

Proceeding as in Example III but commencing with 3-cyano-10-(3-chloropropyl)phenthiazine (15 g.), 4-hydroxy-4-hydroxymethylpiperidine (7.2 g.), ethanol (250 cc.) and sodium carbonate (total 10.6 g.) and isolating the crude base as in Example III but replacing the ether by ethyl acetate, 3-cyano-10-(3,4'-hydroxy-4'-hydroxymethyl-1'-piperidylpropyl)phenthiazine (18 g.) is obtained which, on recrystallisation from ethanol and then from acetonitrile, is a yellow crystalline powder, M.P. 134–135° C.

*Example V*

A solution of 3-methylthio-10-(3-methanesulphonyloxy-2-methylpropyl)phenthiazine (15.1 g.) and 4-hydroxy-4-hydroxymethylpiperidine (10 g.) in anhydrous toluene (150 cc.) is heated under reflux for 18 hours. After cooling, distilled water (200 cc.) is added and the organic phase decanted and extracted with N hydrochloric acid (150 cc.). The aqueous phase is separated and made alkaline with sodium hydroxide solution ($d=1.33$; 25 cc.). The free base is extracted with ether, the organic phase dried over anhydrous potassium carbonate and concentrated to dryness under reduced pressure (about 15 mm. Hg). 3-methylthio-10-(3,4'-hydroxy-4'-hydroxymethyl-1'-piperidyl-2-methylpropyl)phenthiazine (6 g.) is obtained which, after two successive recrystallisations from acetonitrile, is a creamy-white crystalline powder, M.P. 133–135° C.

*Example VI*

Proceeding as in Example V but commencing with 10-(2-methanesulphonyloxypropyl)phenthiazine (12.85 g.) and 4-hydroxy-4-hydroxymethylpiperidine (10 g.) in toluene (130 cc.) and isolating the crude base as in Example V, 10-(2,4'-hydroxy-4'-hydroxymethyl-1'-piperidylpropyl)phenthiazine (6.5 g.) is obtained which, after two successive recrystallisations from acetonitrile, is a white crystalline powder, M.P. 160–162° C.

Example VII

Proceeding as in Example III but commencing with 3 - chloro - 10 - (3 - methanesulphonyloxypropyl)phenthiazine (18.5 g.), 4-hydroxy-4-hydroxymethylpiperidine (7.2 g.), ethanol (250 cc.) and sodium carbonate (total 10.6 g.) and isolating the crude base as in Example III but replacing the ether by ethyl acetate, an oil is obtained which is dissolved in benzene (250 cc.). The solution is filtered through a column of chromatographic alumina (250 g.) and eluted with benzene followed by ethyl acetate containing 5% methanol. 3-chloro-10-(3,4'-hydroxy-4'-hydroxymethyl-1'-piperidylpropyl)phenthiazine (7.3 g.) is obtained in the form of a yellow oil. The acid fumarate prepared in ethyl acetate and recrystallised from methylethylketone melts at 136–139° C.

Example VIII

Proceeding as in Example III but commencing with 3-dimethylsulphamoyl - 10 - (3 - chloropropyl)phenthiazine (19.1 g.), 4-hydroxy-4-hydroxymethylpiperidine (7.2 g.), ethanol (250 cc.) and sodium carbonate (total 10.6 g.) and isolating the base as in Example III, but replacing the ether by ethyl acetate as extraction solvent and sodium hydroxide by sodium carbonate to liberate the base, 3-dimethylsulphamoyl - 10 - (3,4' - hydroxy - 4' - hydroxymethyl-1'-piperidylpropyl)phenthiazine (13 g.) is obtained as a yellow oil, the hydrochloride of which, prepared in ethanol and recrystallised from methanol, melts at 216–220° C.

The present invention further includes within its scope pharmaceutical compositions which comprise one or more compounds of general Formula I or their non-toxic acid addition or quaternary ammonium salts together with a significant amount of a pharmaceutical carrier. The invention includes especially such compositions made up for oral, rectal, or parenteral administration.

Solid compositions for oral administration include compressed tablets, pills, dispersible powders, and granules. In such solid compositions one or more of the active compounds is or are admixed with at least one inert diluent such as calcium carbonate, potato starch, alkinic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, sweetening, flavouring, perfuming and preserving agents.

The compositions according to the invention, for oral administration include capsules of absorbable material such as gelatin containing one or more of the active substances with or without the addition of diluents or excipients.

For rectal administration the active substances may be incorporated in a suppository in manner known per se.

Preparations according to the invention for parenteral administration include sterile aqueous or non-aqueous, solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants, such as preserving, wetting, emulsifying and dispersing agents. They may be sterilised by, for example, filtration through a bacterial-retaining filter, by incorporation in the compositions of sterilising agents, by irradiation, or by heating. They may also be manufactured in the form of sterile solid compositions, which can be dissolved in sterile water or some other injectable medium immediately before use.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time. In general, the preparations should normally contain between 0.1 and 10 mg. per kilogram of weight of the animal to be treated. In human medicine, the preparations of the present invention should be administered so as to give, in the case of oral administration, 10 to 500 mg. of active substance per day.

The following examples illustrate pharmaceutical compositions according to the invention.

Example IX

Tablets are prepared having the following composition:

| | Mg. |
|---|---|
| 3-methoxy - 10 - (3-4'-hydroxy-4'-hydroxymethyl-1'-piperidyl-2-methylpropyl)phenthiazine | 25.8 |
| Starch | 91.2 |
| Silica gel | 30 |
| Magnesium stearate | 3 |

Example X

Tablets weighing 150 mg. are prepared having the following composition:

| | Mg. |
|---|---|
| 3 - trifluoromethyl - 10 - (3-4' - hydroxy-4'-hydroxymethyl-1'-piperidylpropyl)phenthiazine | 25 |
| Starch | 92 |
| Silica gel | 30 |
| Magnesium stearate | 3 |

Example XI

Tablets are prepared having the following composition:

| | Mg. |
|---|---|
| 3-chloro - 10 - (3 - 4' - hydroxy-4'-hydroxymethyl-1'-piperidylpropyl)-phenthiazine acid fumarate | 32 |
| Starch | 85 |
| Silica gel | 30 |
| Magnesium stearate | 3 |

Example XII

Tablets are prepared having the following composition:

| | Mg. |
|---|---|
| 3-cyano - 10 - (3 - 4' - hydroxy-4'-hydroxymethyl-1'-piperidylpropyl)-phenthiazine | 10 |
| Starch | 105 |
| Silica gel | 32 |
| Magnesium stearate | 3 |

We claim:

1. A member of the class consisting of phenthiazine derivatives of the formula:

wherein X represents a member of the class consisting of hydrogen and halogen atoms, alkyl, alkoxy and alkylthio groups containing at most four carbon atoms, dimethylsulphamoyl, cyano and trifluoromethyl groups, A represents a divalent, saturated aliphatic, wholly hydrocarbon, group of two to four carbon atoms with at least two carbon atoms between the nitrogen atoms of the phenthiazinyl and piperidyl nuclei, and $n$ is an integer selected from 1 and 2 and their non-toxic acid addition salts.

2. 3-methoxy-10-(3 - 4' - hydroxy-4'-β-hydroxyethyl-1'-piperidyl-2-methylpropyl)phenthiazine.

3. 3-methoxy - 10 - (3-4'-hydroxy-4'-hydroxymethyl-1'-piperidyl-2-methylpropyl)phenthiazine.

4. 3-trifluoromethyl-10-(3 - 4' - hydroxy - 4' - hydroxymethyl-1'-piperidylpropyl)phenthiazine.

5. 3-cyano - 10 - (3-4'-hydroxy-4'-hydroxymethyl-1'-piperidylpropyl)-phenthiazine.

6. 3-methylthio-10-(3 - 4' - hydroxy-4'-hydroxymethyl-1'-piperidyl-2-methylpropyl)phenthiazine.

7. 10-(2-4'-hydroxy - 4' - hydroxymethyl-1'-piperidylpropyl)phenthiazine.

8. 3-chloro-10-(3-4' - hydroxy - 4' - hydroxymethyl-1'-piperidylpropyl)phenthiazine.

9. 3-dimethylsulphamoyl - 10 - (3 - 4' - hydroxy-4'-hydroxymethyl-1'-piperidylpropyl)phenthiazine.

References Cited in the file of this patent

FOREIGN PATENTS 1,212,031    France _____ Oct. 19, 1959